(12) United States Patent
Natesan et al.

(10) Patent No.: US 11,120,594 B2
(45) Date of Patent: Sep. 14, 2021

(54) FLOOR PLANNING AND PLACEMENT OF OBJECTS IN A LOADING SPACE

(71) Applicant: INTERNATIONAL BUSINESS MACHINES CORPORATION, Armonk, NY (US)

(72) Inventors: Jayapreetha Natesan, Hopewell Junction, NY (US); Gerald Stanquist, Salt Point, NY (US); Chanchal Saha, Beacon, NY (US); Michael Lapointe, Saugerties, NY (US); Sumant Singh Rana, Singapore (SG); Jason Hirst, Poughkeepsie, NY (US); Natesan Venkateswaran, Hopewell Junction, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/429,223

(22) Filed: Jun. 3, 2019

(65) Prior Publication Data

US 2020/0380746 A1 Dec. 3, 2020

(51) Int. Cl.
*G06T 11/60* (2006.01)
*G06T 7/70* (2017.01)
(Continued)

(52) U.S. Cl.
CPC .......... *G06T 11/60* (2013.01); *A47L 15/4293* (2013.01); *A47L 15/4295* (2013.01);
(Continued)

(58) Field of Classification Search
None
See application file for complete search history.

(56) References Cited

U.S. PATENT DOCUMENTS 9,381,645 B1 * 7/2016 Yarlagadda ............ B25J 9/1633
9,510,729 B2 12/2016 Fey et al.
(Continued)

OTHER PUBLICATIONS

Imai et al., "A User Support System That Optimizes Dishwasher Loading", IEEE 6th Global Conference on Consumer Electronics, 2017, 2 pages.

*Primary Examiner* — Michelle Chin
(74) *Attorney, Agent, or Firm* — Cantor Colburn LLP; Tihon Poltavets (57) ABSTRACT

Methods, systems, and computer program products for placement of objects in a loading space are provided. Aspects include determining item data for a plurality of items, determining space data for a loading space, generating an optimized configuration for placement of the plurality of items in the loading space comprising determining one or more geometric representations for each item in the plurality of items, wherein the one or more geometric representations for each item are coupled together, determining, by an algorithm, a location in the loading space for each item in the plurality of items based on the one or more geometric representations for each item and the space data, and displaying, by a display, the optimized configuration comprising an image of each item of the plurality of items overlaid on corresponding locations in an image of the loading space.

17 Claims, 8 Drawing Sheets

(51) Int. Cl.
    *G06T 17/10*         (2006.01)
    *G06N 20/00*        (2019.01)
    *A47L 15/42*        (2006.01)

(52) U.S. Cl.
    CPC ............ G06N 20/00 (2019.01); G06T 7/70 (2017.01); G06T 17/10 (2013.01); *A47L 2501/36* (2013.01)

(56) References Cited

U.S. PATENT DOCUMENTS

| | | | |
|---|---|---|---|
| 9,545,185 | B2 | 1/2017 | Lee et al. |
| 9,981,382 | B1 * | 5/2018 | Strauss ............... B25J 9/1666 |
| 10,080,477 | B2 | 9/2018 | Fauth et al. |
| 10,746,589 | B1 * | 8/2020 | Danenberg ............ G01G 19/42 |
| 10,809,122 | B1 * | 10/2020 | Danenberg ............ G01G 21/28 |
| 2008/0302399 | A1 | 12/2008 | Classen et al. |
| 2015/0096266 | A1 * | 4/2015 | Divine ..................... A61J 1/03 53/452 |
| 2015/0199627 | A1 | 7/2015 | Gould et al. |
| 2015/0206098 | A1 * | 7/2015 | Muench ............ G06Q 10/0835 705/337 |
| 2017/0119232 | A1 | 5/2017 | Ugel et al. |
| 2017/0253354 | A1 * | 9/2017 | Colson .................. B29C 70/70 |
| 2018/0068255 | A1 | 3/2018 | Hance et al. |

\* cited by examiner

FLOOR PLANNING AND PLACEMENT OF OBJECTS IN A LOADING SPACE

BACKGROUND

The present invention generally relates to object placement, and more specifically, to floor planning and placement of objects in a loading space.

Packing problems are a class of optimization problems in mathematics that involve attempting to pack objects together into containers. The goal is to either pack a single container as densely as possible or pack all objects using as few containers as possible. Many of these problems can be related to real life packaging, storage, and transportation issues. Each packing problem has a dual covering problem, which asks how many of the same objects are required to completely cover every region of the container, where objects are allowed to overlap.

Solutions to these packing problems cover a wide range of applications such as, for example, warehousing configurations, placing microelectronic circuits on printed circuit boards, and loading dishwashers, refrigerators, and other appliances for the maximum storage of perishable items. However, issues can arise when there are irregular objects and loading space constraints when running a standard packing optimization algorithm. In addition, item constraints for loading items need to be taken into consideration.

SUMMARY

Embodiments of the present invention are directed to a computer-implemented method for placement of objects in a loading space A non-limiting example of the computer-implemented method includes determining item data for a plurality of items, determining space data for a loading space, generating an optimized configuration for placement of the plurality of items in the loading space comprising determining one or more geometric representations for each item in the plurality of items, wherein the one or more geometric representations for each item are coupled together, determining, by an algorithm, a location in the loading space for each item in the plurality of items based on the one or more geometric representations for each item and the space data, and displaying, by a display, the optimized configuration comprising an image of each item of the plurality of items overlaid on corresponding locations in an image of the loading space.

Embodiments of the present invention are directed to a system for placement of objects in a loading space. A non-limiting example of the system includes a processor configured to perform determining item data for a plurality of items, determining space data for a loading space, generating an optimized configuration for placement of the plurality of items in the loading space comprising determining one or more geometric representations for each item in the plurality of items, wherein the one or more geometric representations for each item are coupled together, determining, by an algorithm, a location in the loading space for each item in the plurality of items based on the one or more geometric representations for each item and the space data, and displaying, by a display, the optimized configuration comprising an image of each item of the plurality of items overlaid on corresponding locations in an image of the loading space.

Embodiments of the invention are directed to a computer program product for placement of objects in a loading space, the computer program product comprising a computer readable storage medium having program instructions embodied therewith. The program instructions are executable by a processor to cause the processor to perform a method. A non-limiting example of the method includes determining item data for a plurality of items, determining space data for a loading space, generating an optimized configuration for placement of the plurality of items in the loading space comprising determining one or more geometric representations for each item in the plurality of items, wherein the one or more geometric representations for each item are coupled together, determining, by an algorithm, a location in the loading space for each item in the plurality of items based on the one or more geometric representations for each item and the space data, and displaying, by a display, the optimized configuration comprising an image of each item of the plurality of items overlaid on corresponding locations in an image of the loading space.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
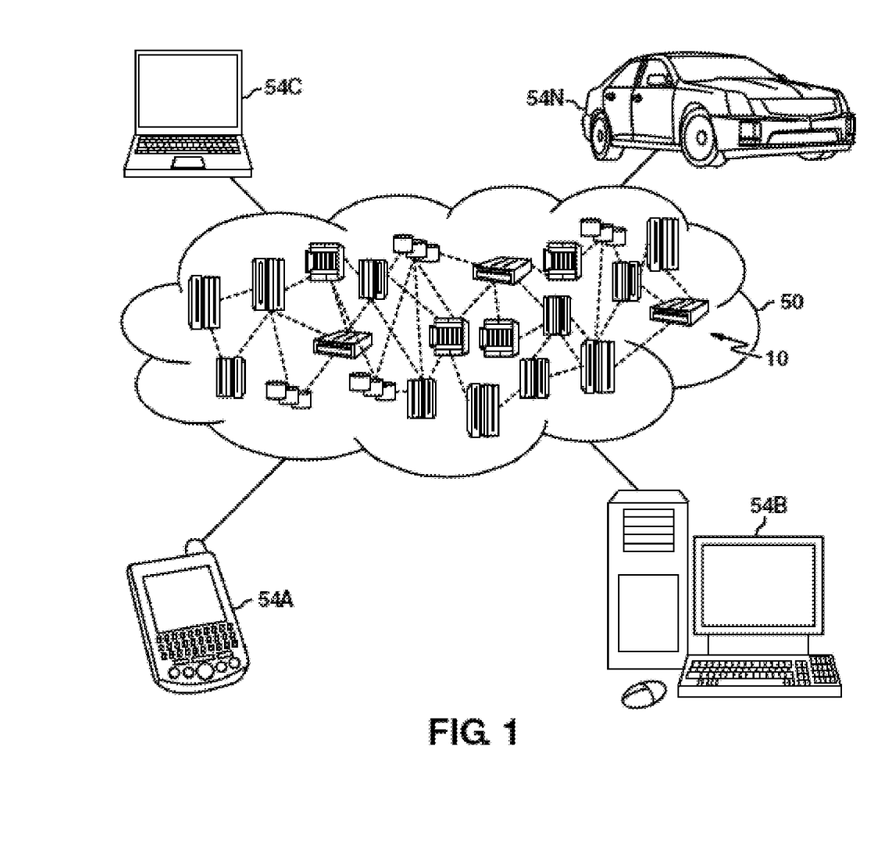
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
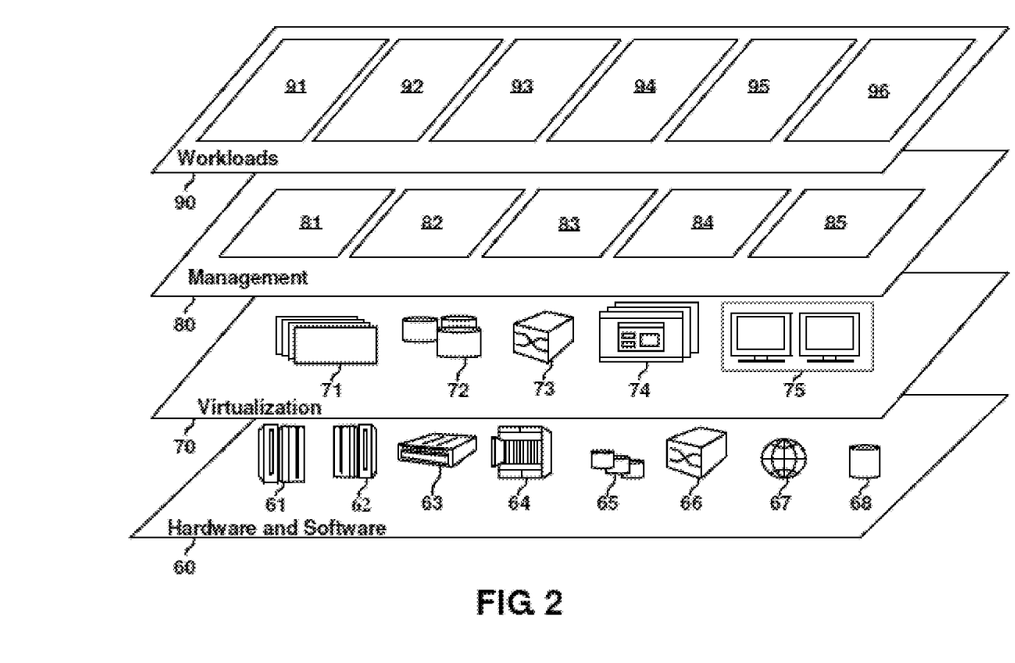
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and floorplanning and placement of objects in a loading space 96.

Figure 3:
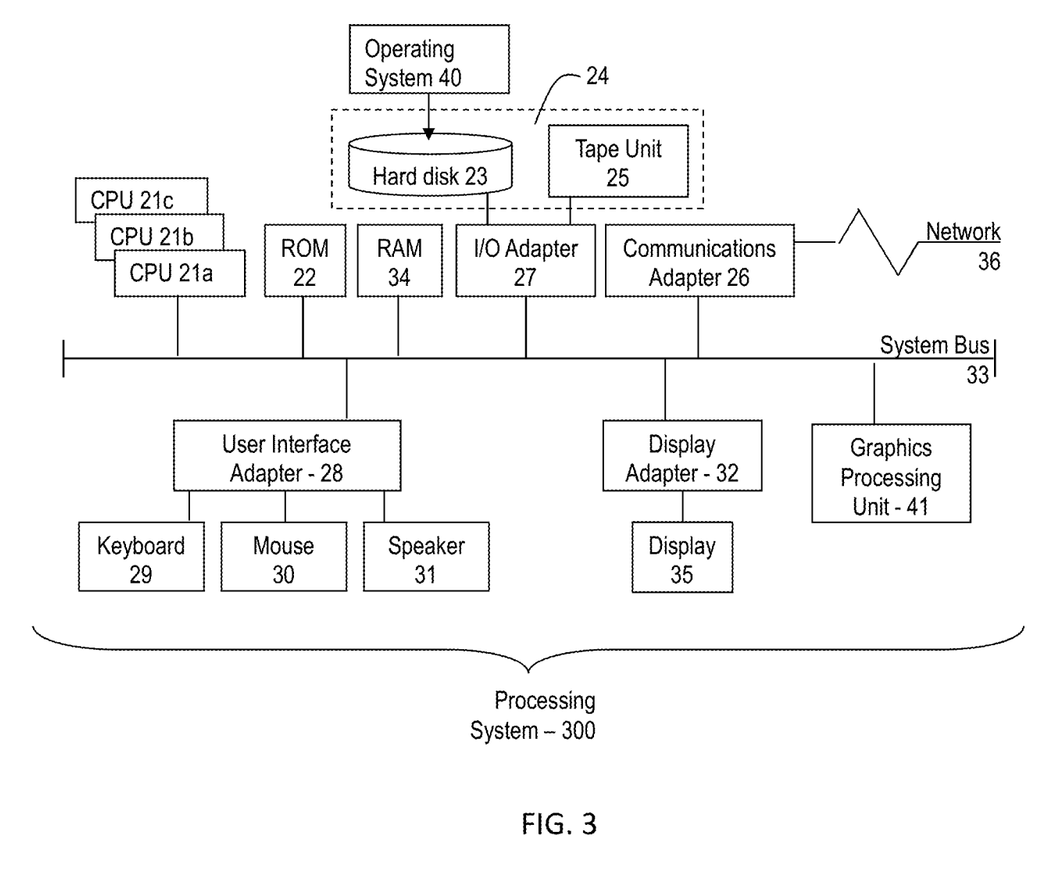
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where the processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system that coordinates the functions of the various components shown in FIG. 3.

Turning now to an overview of technologies that are more specifically relevant to aspects of the invention, packing problems are a class of optimization problems that involve attempting to pack objects together into a finite space. In a bin-packing problem, a set of 'objects' some or all of which must be packed into a container. In addition, packing constraints or packing 'rules' usually further constrain finding a solution due to limitations on how packing can be performed such as, for example, items can or cannot be stacked, weight restrictions in certain areas of the packing area, certain object types are restricted from certain locations in the packing area. For example, consider loading dishes, glasses, and cutlery into a dishwasher. Certain restrictions on the dishes might restrict where a dish can be placed such as different levels within the dishwasher for plastic dishes. These restrictions as well as the non-uniform shapes, sizes, and types of the items to be loaded in the dishwasher can result in non-optimized packing of the dishwasher when using a heuristic methodology. Further, the failure to optimize the space usage in loading areas for a dishwasher can require multiple, unnecessary cycles that result in added water usage, time for cleaning, and other costs.

Turning now to an overview of the aspects of the invention, one or more embodiments of the invention address the above-described shortcomings of the prior art by providing systems and methods that compute the most optimal placement and layout of objects or items in a loading area (such as, a dishwasher) while considering the energy efficiency, material, and other variables associated with the items and the loading area utilizing internet-of-things (IoT) sensor and artificial intelligence.

Figure 4:
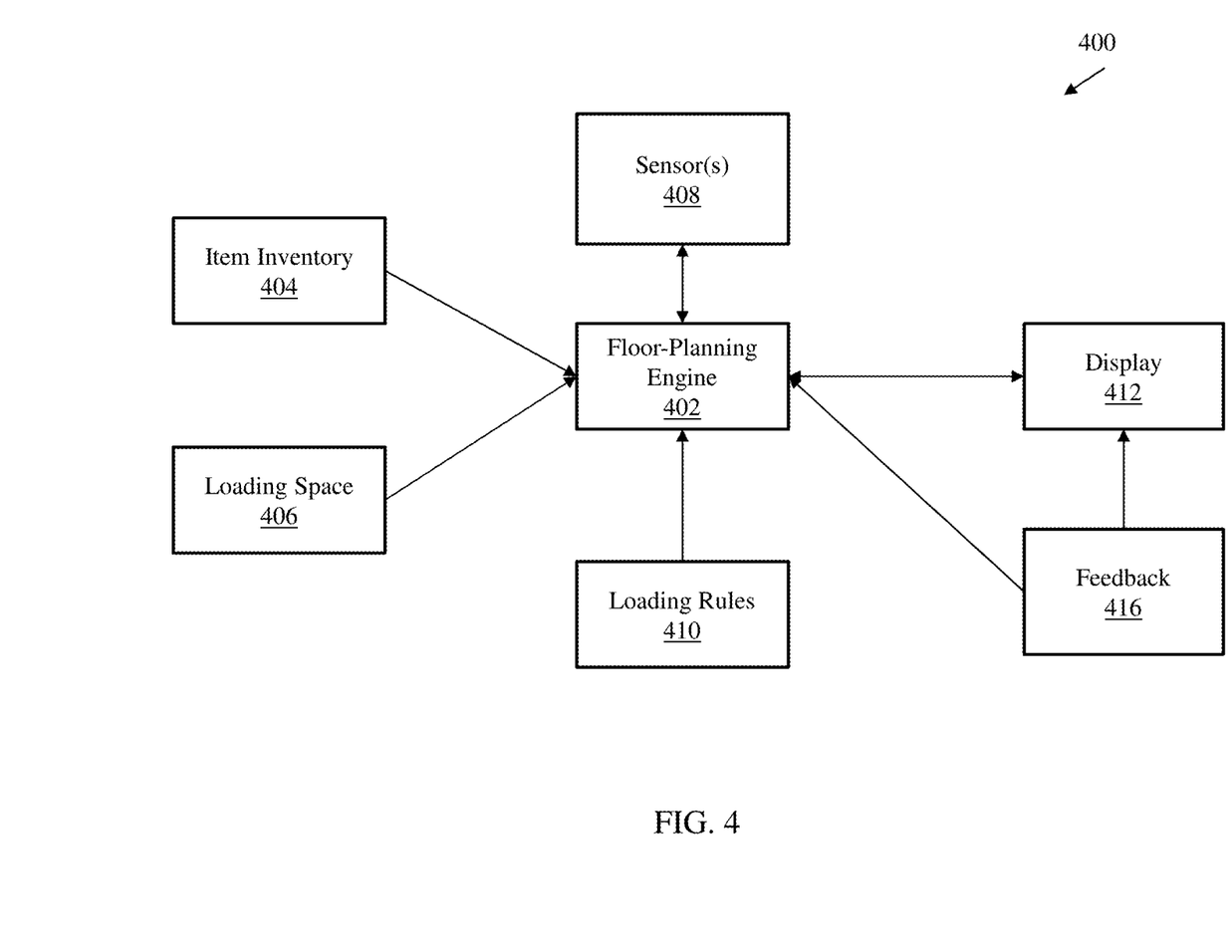
FIG. 4 depicts a block diagram of a system for placement of objects in a loading space according to embodiments of the invention.

Turning now to a more detailed description of aspects of the present invention, FIG. 4 depicts a block diagram of a system for placement of objects in a loading space according to embodiments of the invention. The system 400 includes a floor planning engine 402, at least one sensor 408, and a display 412. In one or more embodiments of the invention, the floor planning engine 402 takes in data associated with an item inventory 404. The item inventory 404 can be any type of item that is to be stored in a loading space 406. For example, the item inventory can be dishes that are to be placed into a dishwasher (e.g., loading space). For each loading space 406 and item inventory 404, there are a set of loading rules 410 that can dictate how and where certain items in the item inventory 404 can be placed or loaded into the loading space 406. For example, certain items may not be stackable or might be too heavy for certain areas in the loading space 406. The loading rules 410 can include some or all of the loading restrictions for a given loading space 406 and item inventory 404. In some embodiments of the invention, a sensor 408 can be utilized to obtain data associated with the item inventory 404 including, but not limited to, item weight, item material, item type, item shape, and the like. In addition, the sensor(s) 408 can obtain data associated with the loading space 406 that will reveal characteristics of the loading space 406 including, but not limited to, geometric size, configuration, obstructions, weight capacities, and the like. For example, a shelving space for loading items may have a weight rating that can be determined either through the sensor(s) 408 or through the loading rules 410 to assist with how and where items can be placed on the shelving space. Alternatively, an item in the inventory 404 could be a dish with a deep hollow space and a long handle.

In one or more embodiments of the invention, the floor-planning engine 402 utilizing a sensor(s) 408 or receiving item inventory data and loading space data can determine an optimized configuration for the item inventory 404 in the loading space 406. In some embodiments, the sensor(s) 408 can be a camera that captures images or video of the item inventory 404 and the loading space 406 for processing by the floor-planning engine 402. The floor-planning engine 402 can then determine an optimized configuration for the items in the item inventory 404 to be placed at specified locations within the loading space 406. The floor-planning engine 402 can then display on the display 412 the optimized configuration by overlaying an image of each item in a corresponding location in an image of the loading space 406. In other embodiments, the floor-planning engine 402 can display a step-by-step loading order for each time into the loading space 406 that results in the optimized configuration.

In one or more embodiments of the invention, the floor planning engine 402 can create the optimized configuration utilizing an algorithm or model for solving packing problems which, as mentioned above, are a class of optimization problems. One such algorithm that can be utilized is a so-called bin-packing algorithm. The floor-planning engine 402 can analyze each item in the item inventory 404 to create a three-dimensional (3D) rendering of the item. This can be done utilizing a camera (e.g., sensor 408) to obtain the image of the item. Sensor(s) 408 other than a camera can be utilized to determine the material composition of the item and the weight of the item in addition to other characteristics. The 3D representation of the item includes one or more geometric shapes or prisms. In some embodiments, the geometric prisms are rectangular prisms. An item can be represented as one or more of these rectangular prisms based on the shape of the item and these one or more prisms are connected to each other such that when one of the rectangular prisms is placed, the other connected rectangular prisms are constrained to go with the one rectangular prism. Along with the items being represented, the loading space 406 is represented in a 3D model. The constraints of the 3D model are included based on sensor or image data taken of the loading space 406. The constraints can include size, shape, and obstruction constraints found in the loading space. For example, for loading a dishwasher, the loading space in the dishwasher may have different racks and protrusions to allow for placement of dishes, glasses, and cutlery. This loading space is modeled along with the connected rectangular prisms for each item to determine an optimized configuration. In addition, the loading rules 410 can also affect the optimized configuration of items in the loading space 406 by restricting certain items from certain locations or restricting stacking of items. For a dishwasher application, certain dishes or pots and pans need to be placed a certain way to allow for effective cleaning of these items by the dishwasher.

Figure 5A:
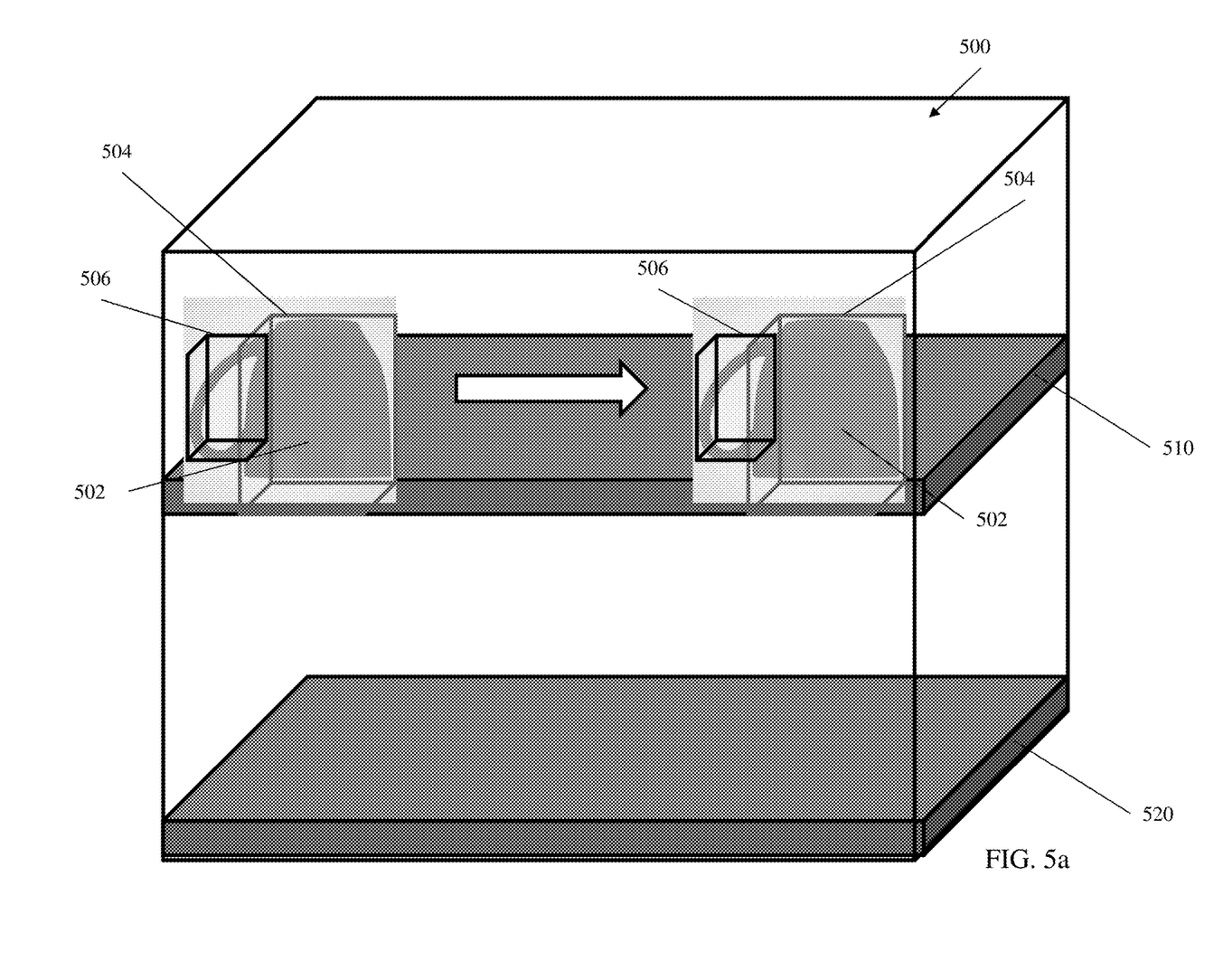
FIG. 5a depicts an illustrative example of the rectangular prisms associated with an item according to one or more embodiments of the invention.

FIG. 5a depicts an illustrative example of the rectangular prisms associated with an item according to one or more embodiments of the invention. In one or more embodiments of the invention, the loading space 500 can be, for example, a dishwasher loading space that includes a top rack 510 and a bottom rack 520. An item 502 can be a mug to be placed in the loading space 500. The item 502 includes a non-uniform shape having a main body and a handle which are represented by a rectangular prism 504 for the main body and a second rectangular prism 506 for the handle of the item 502. Because the item 502 is non-uniform, the rectangular prisms 504, 506 are non-uniform (e.g., smaller and shaped different). As the loading space 500 and the item 502 are modeled to determine an optimized configuration, the item 502 may be moved to different locations in the loading space 500. When the item 502 is moved, the rectangular prisms 504, 506 also move and maintain the same placement with respect to each other. In one embodiment, this requirement (of connected prisms moving together) is satisfied by specifying additional constraints to a 3-D bin-packing formulation. That is to say, prism 506 cannot be moved to one location while prism 504 is moved to another. Also, prism 506 stays in the same location in reference to prism 504 so that when moved or rotated, the prisms 504, 506 will rotate or move together. In addition, the loading space 500 herein is an exemplary dishwasher application with a set of loading rules that the floor-planning engine (402 from FIG. 4) will utilize for placing the item 502. In this case, since the item 502 is a mug, the loading rule may restrict mugs to placement on the top rack 510 of the dishwasher (e.g., loading space 500). In addition, the placement of the mug is such that the open portion of the mug is faced down, instead of up or to the side.

In one or more embodiments of the invention, referring to both FIG. 4 and FIG. 5a, the floor-planning engine 402 can receive feedback 416 from a loader of the items either directly to the floor-planning engine 402 or through the display 412. This feedback 416 can be utilized as training data for a learning algorithm utilized for placement optimization to learn based on any changes to the configuration from a loader. The feedback 416, for example, could be a change in the configuration of the item 502 from one location to another. The change in configuration could be detected by the sensor(s) 408 or could be inputted by a user or loader. For example, if the mug in FIG. 5 was placed where the open portion was facing up or to the side and then a user then rearranges the mug so that it is facing down, this change could be utilized to further train the learning algorithm and/or be added to a set of loading rules for the loading space 500.

Figure 5B:
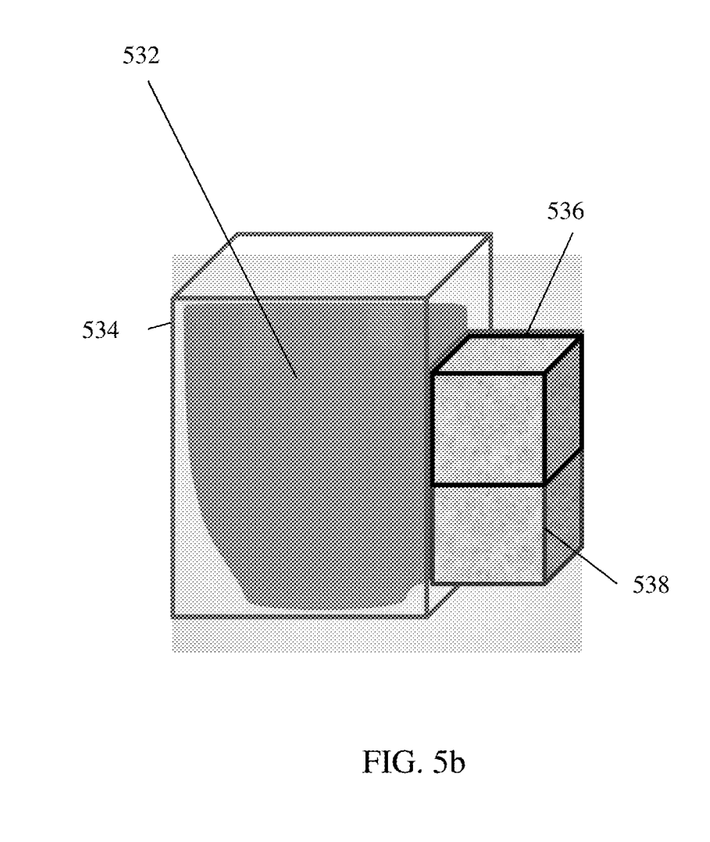
FIG. 5b depict an illustrative example of the rectangular prisms associated with an item according to one or more embodiments of the invention.
Figure 5C:
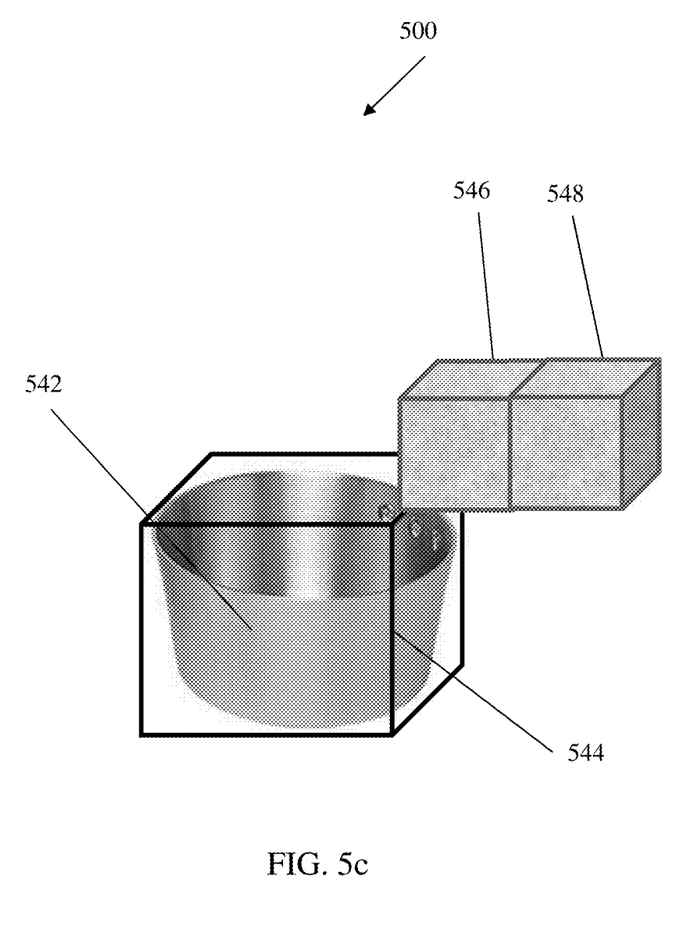
FIG. 5c depict an illustrative example of the rectangular prisms associated with an item according to one or more embodiments of the invention.

FIGS. 5b and 5c depict an illustrative example of the rectangular prisms associated with an item according to one or more embodiments of the invention. As shown in FIG. 5b, an item 532 (e.g., mug) includes a non-uniform shape due to having a cup portion and a handle attached to the mug. In one or more embodiments, rectangular prisms 534, 536, 538 are modeled to determine an optimized configuration within a loading space. Here, the handle of the mug includes two rectangular prisms 536, 538 that are associated with the larger prism for the mug portions rectangular prism 534. When the item 532 is placed in a loading space, the rectangular prisms 534, 536, 538 move and maintain the same placement as each other. That is to say, prism 534 cannot move without both 536 and 538 moving with it and with the same configuration. Similarly, as shown in FIG. 5c, an item 542 with a non-uniform shape (i.e., a large handle) has a first rectangular prism 544 around the bowl portion of the item 542 and a second and third rectangular prism 546, 548 for the handle. As mentioned above, the the first rectangular prism 544 moves with the second 546 and third 548 rectangular prisms during floor-planning. In one embodiment, this requirement (of connected prisms moving together) is satisfied by specifying additional constraints to a 3-D bin-packing formulation.

Figure 6:
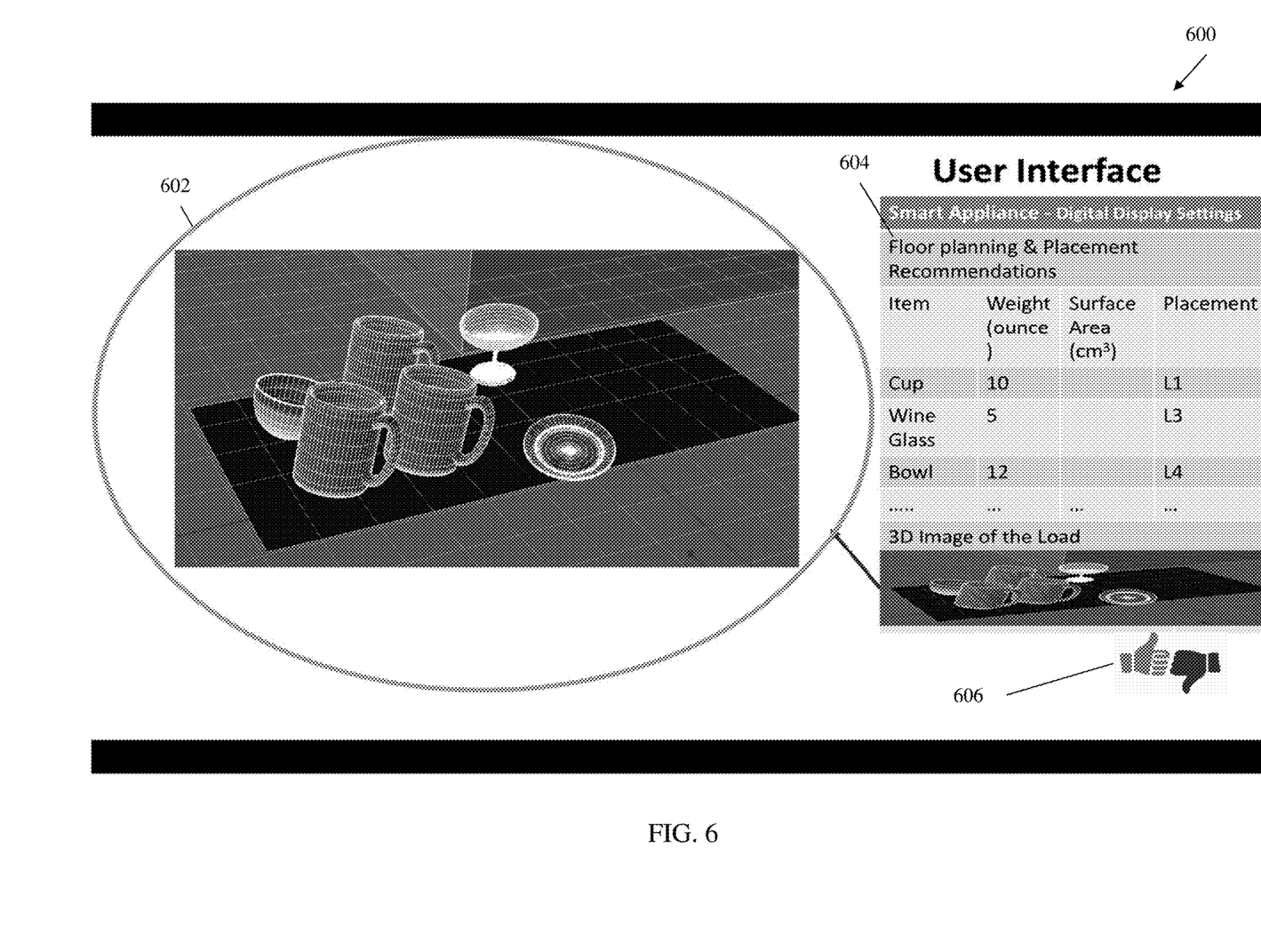
FIG. 6 depicts a display for the optimized configuration according to one or more embodiments of the invention.

FIG. 6 depicts a display for the optimized configuration according to one or more embodiments of the invention. The display 600 includes an image 602 of the suggested optimized configuration for a user to load into a loading space. As shown in the illustrated image 602, the image of the items are overlaid onto an image of the loading space to show where the items are to be placed and in what manner the items are to be placed (e.g., facing up or down, etc.). The display 600 also includes a user interface 604 that a user can obtain information about the items and where they are placed. The information can include item type (cup, glassware, bowl, etc.), the weight of each item, the surface area, a placement location, and the like. In addition, the display 600 also includes an input 606 for feedback from the user to assist with training the learning model being utilized for optimizing the configuration. In this case, the input 606 is a "thumbs up" or "thumbs down" icon; however, in some embodiments, the input can be any type of icon or feedback mechanism.

In one or more embodiments of the invention, the sensor (s) 408, in the dishwasher application, can be a docking rack that creates the 3D representation of items for loading into the dishwasher. This docking rack can, in addition to the 3D representation, also sense the composition of the item and the weight, etc. The display 412 can show a user how to load items into the docking rack which can then be loaded into a dishwasher, in the dishwasher application. Each item is modeled to determine one or more connected rectangular prisms by the floor-planning engine 402. These items can be categorized and stored in a database by the floor-planning engine 402. When an unclean dish is placed in the loading rack, the dish is scanned and identified against the database. This data is then analyzed by an optimization algorithm that takes into account the rack dimension and any additional loading rules (spoon holder, spool of the rack, etc.). As mentioned above, the algorithm is constrained to keep connected prisms together. The output for display 412 can be an ordered listing of objects and their respective positions in the dishwasher or can be a 3D image. Any user feedback 416 can be utilized to train the algorithm for future loading optimization operations.

Figure 7:
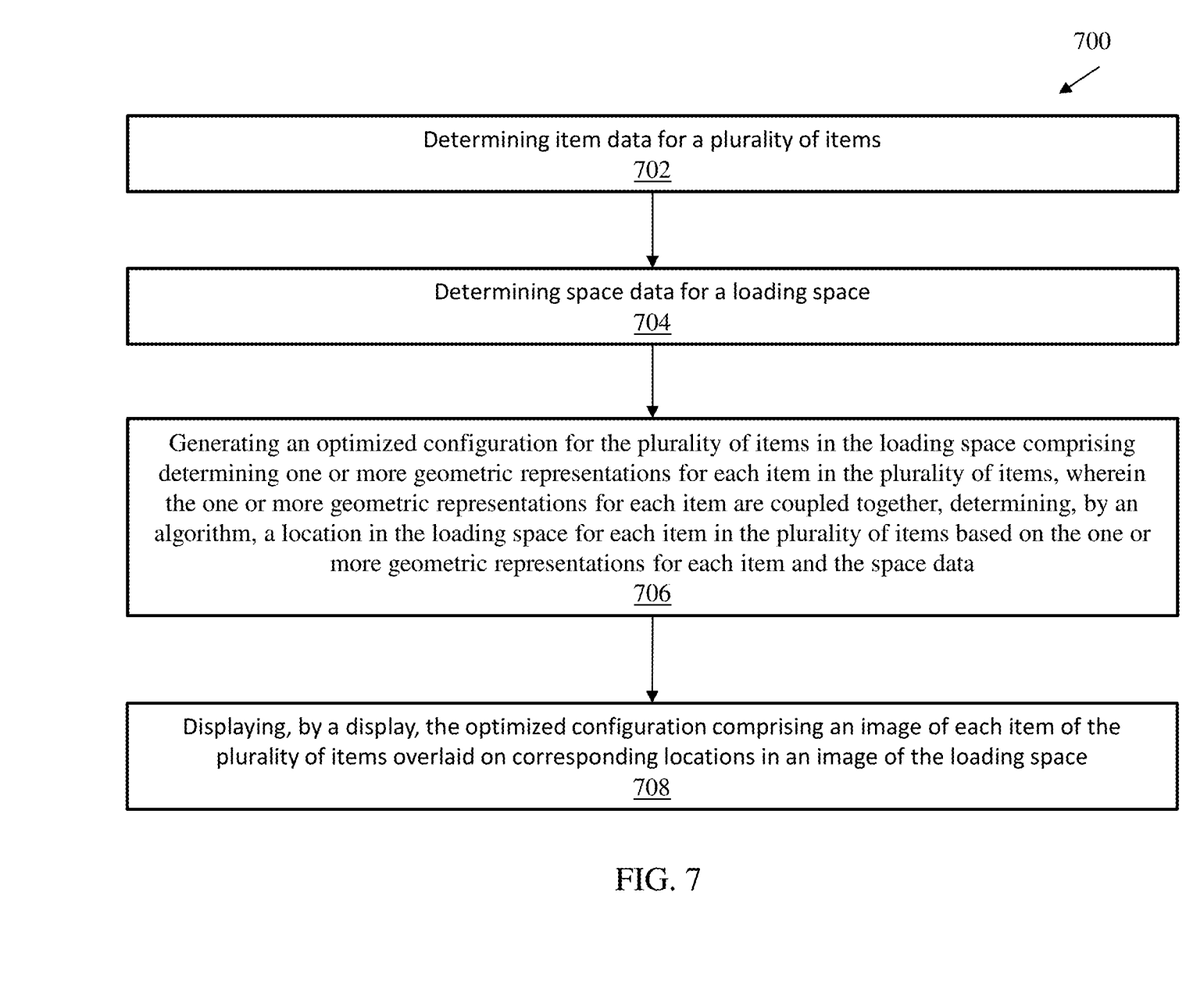
FIG. 7 depicts a flow diagram of a method for placement of objects in a loading space according to one or more embodiments of the invention.

FIG. 7 depicts a flow diagram of a method for placement of objects in a loading space according to one or more embodiments of the invention. The method 700 includes determining item data for a plurality of items, as shown in block 702. In block 704, the method 700 also includes determining space data for a loading space. Also, at block 706, the method 700 includes generating an optimized configuration for the plurality of items in the loading space comprising determining one or more geometric representations for each item in the plurality of items, wherein the one or more geometric representations for each item are coupled together, determining, by an algorithm, a location in the loading space for each item in the plurality of items based on the one or more geometric representations for each item and the space data. And at block 708, the method 700 includes displaying, by a display, the optimized configuration comprising an image of each item of the plurality of items overlaid on corresponding locations in an image of the loading space.

Additional processes may also be included. It should be understood that the processes depicted in FIG. 7 represent illustrations, and that other processes may be added or existing processes may be removed, modified, or rearranged without departing from the scope and spirit of the present disclosure.

In embodiments of the invention, the engines 402 can also be implemented as so-called classifiers (described in more detail below). In one or more embodiments of the invention, the features of the various engines/classifiers (402) described herein can be implemented on the processing system 300 shown in FIG. 3, or can be implemented on a neural network (not shown). In embodiments of the invention, the features of the engines/classifiers 402 can be implemented by configuring and arranging the processing system 300 to execute machine learning (ML) algorithms. In general, ML algorithms, in effect, extract features from received data (e.g., inputs to the engines 402) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 402 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for placement of objects in a loading space, the method comprising:
   determining item data for a plurality of items, wherein the determining the item data comprises obtaining, by at least one sensor, one or more item characteristics for each of the plurality of items;
   determining a three dimensional (3D) rendering of a loading space, wherein the 3D rendering comprises a layout having one or more protrusions in the loading space;
   generating an optimized configuration for placement of the plurality of items in the loading space comprising:
      determining one or more geometric representations for each item in the plurality of items, wherein the one or more geometric representations for each item are coupled together, and wherein the one or more geometric representations comprise rectangular prisms;
      determining, by learning algorithm, a location in the loading space for each item in the plurality of items based on the one or more geometric representations for each item and the space data; and
   displaying, by a display, the optimized configuration comprising an image of each item of the plurality of items overlaid on corresponding locations in the 3D rendering of the loading space, wherein the algorithm comprises a learning model;
   receiving user feedback for the optimized configuration; and
   updating the learning model based at least in part on the user feedback.

2. The computer-implemented method of claim 1, wherein the one or more geometric representations are non-uniform.

3. The computer-implemented method of claim 1, wherein the one or more item characteristics comprises at least one of an item weight, an item material, and item type.

4. The computer-implemented method of claim 1, further comprising receiving a set of rules associated with the loading space, wherein generating the optimized configuration is based at least in part on the set of rules.

5. The computer-implemented method of claim 4, wherein at least one rule in the set of rules comprises a material restriction for at least one location in the loading space.

6. The computer-implemented method of claim 4, wherein at least one rule in the set of rules comprises a weight restriction for at least one location in the loading space.

7. The computer-implemented method of claim 1, wherein the loading space comprises a dishwasher.

8. A system for placement of objects in a loading space, the system comprising:
   a processor communicatively coupled to a memory, the processor configured to:
      determine item data for a plurality of items, wherein the determining the item data comprises obtaining, by at least one sensor, one or more item characteristics for each of the plurality of items;
      determine a three dimensional (3D) rendering of a loading space, wherein the 3D rendering comprises a layout having one or more protrusions in the loading space;
      generate an optimized configuration for the plurality of items in the loading space comprising:
         determine one or more geometric representations for each item in the plurality of items, wherein the one or more geometric representations for each item are coupled together, and wherein the one or more geometric representations comprise rectangular prisms;
         determine, by an algorithm, a location in the loading space for each item in the plurality of items based on the one or more geometric representations for each item and the space data; and display, by a display, the optimized configuration comprising an image of each item of the plurality of items overlaid on corresponding locations in the 3D rendering of the loading space, wherein the algorithm comprises a learning model;

receive user feedback for the optimized configuration; and update the learning model based at least in part on the user feedback.

9. The system of claim 8, wherein the one or more geometric representations are non-uniform.

10. The system of claim 8, wherein determining item data for the plurality of items comprises:

obtaining, by at least one sensor, one or more item characteristics associated with at least one item in the plurality of items.

11. The system of claim 10, wherein the one or more item characteristics comprises at least one of an item weight, an item material, and item type.

12. The system of claim 8, wherein the processor is further configured to receive a set of rules associated with the loading space, wherein generating the optimized configuration is based at least in part on the set of rules.

13. A computer program product for placement of objects in a loading space comprising a computer readable storage medium having program instructions embodied therewith, the program instructions executable by a processor to cause the processor to perform a method comprising:

determining item data for a plurality of items, wherein the determining the item data comprises obtaining, by at least one sensor, one or more item characteristics for each of the plurality of items;

determining a three dimensional (3D) rendering of a loading space, wherein the 3D rendering comprises a layout having one or more protrusions in the loading space;

generating an optimized configuration for the plurality of items in the loading space comprising:

determining one or more geometric representations for each item in the plurality of items, wherein the one or more geometric representations for each item are coupled together, and wherein the one or more geometric representations comprise rectangular prisms;

determining, by an algorithm, a location in the loading space for each item in the plurality of items based on the one or more geometric representations for each item and the space data; and displaying, by a display, the optimized configuration comprising an image of each item of the plurality of items overlaid on corresponding locations in the 3D rendering of the loading space, wherein the algorithm comprises a learning model;

receiving user feedback for the optimized configuration; and updating the learning model based at least in part on the user feedback.

14. The computer program product of claim 13, wherein the one or more geometric representations are non-uniform.

15. The computer program product of claim 13, wherein determining item data for the plurality of items comprises:

obtaining, by at least one sensor, one or more item characteristics associated with at least one item in the plurality of items.

16. The computer program product of claim 15, wherein the one or more item characteristics comprises at least one of an item weight, an item material, and item type.

17. The computer program product of claim 13, further comprising receiving a set of rules associated with the loading space, wherein generating the optimized configuration is based at least in part on the set of rules.

* * * * *